United States Patent
Lee et al.

(10) Patent No.: US 9,615,003 B2
(45) Date of Patent: Apr. 4, 2017

(54) GAMMA APPLIED DATA GENERATING CIRCUIT AND DISPLAY DEVICE INCLUDING THE SAME

(71) Applicant: Samsung Display Co., LTD., Yongin, Gyeonggi-Do (KR)

(72) Inventors: Dong-Gyu Lee, Seoul (KR); Joon-Chul Goh, Hwaseong-si (KR); Nam-Gon Choi, Yongin-si (KR); Cheol-Woo Park, Suwon-si (KR); Bong-Hyun You, Yongin-si (KR)

(73) Assignee: Samsung Display Co., Ltd., Samsung-ro, Giheung-Gu, Yongin-si, Gyeonngi-Do (KR)

( * ) Notice: Subject to any disclaimer, the term of this patent is extended or adjusted under 35 U.S.C. 154(b) by 66 days.

(21) Appl. No.: 14/600,220

(22) Filed: Jan. 20, 2015

(65) Prior Publication Data
US 2016/0065793 A1  Mar. 3, 2016

(30) Foreign Application Priority Data
Sep. 1, 2014 (KR) .................... 10-2014-0115307

(51) Int. Cl.
*H04N 5/202* (2006.01)
*G09G 3/36* (2006.01)
(Continued)

(52) U.S. Cl.
CPC .......... *H04N 5/202* (2013.01); *G09G 3/3406* (2013.01); *G09G 3/3648* (2013.01);
(Continued)

(58) Field of Classification Search
CPC .. G09G 3/3406; G09G 3/3648; G09G 3/3685; G09G 2300/0443;
(Continued)

(56) References Cited

U.S. PATENT DOCUMENTS

| 8,063,863 B2 * | 11/2011 | Yano ................. G09G 3/2025 345/690 |
| 2003/0006952 A1 * | 1/2003 | Hong ................. G09G 3/3648 345/89 |

(Continued)

FOREIGN PATENT DOCUMENTS

| KR | 1020140003146 A | 1/2014 |
| KR | 10-2016-0011817 A | 2/2016 |

*Primary Examiner* — Stephen Sherman
(74) *Attorney, Agent, or Firm* — Robert E. Bushnell, Esq.

(57) ABSTRACT

Gamma applied data generating circuit includes motion vector extractor, gamma pattern generator, first gamma applier, second gamma applier, and output converter. Motion vector extractor extracts motion vector of object. Gamma pattern generator generates first gamma pattern corresponding to first motion vector value and second gamma pattern corresponding to second motion vector value from first time point. Value of motion vector is changed from first motion vector value to second motion vector value at first time point. First and second gamma appliers generate first and second data by applying first and second gamma pattern to input data, respectively. Output converter outputs sum of first data times first weight and second data times second weight as gamma applied data. From first time point to second time point, output converter converts first weight from 1 to 0 and converts second weight from 0 to 1.

15 Claims, 8 Drawing Sheets

(51) Int. Cl.
*G09G 3/34* (2006.01)
*H04N 5/14* (2006.01)

(52) U.S. Cl.
CPC ... *G09G 3/3685* (2013.01); *G09G 2300/0443* (2013.01); *G09G 2320/0252* (2013.01); *G09G 2320/0276* (2013.01); *G09G 2320/0673* (2013.01); *G09G 2320/106* (2013.01); *H04N 5/144* (2013.01)

(58) Field of Classification Search
CPC ... G09G 2320/0252; G09G 2320/0276; G09G 2320/0673; G09G 2320/106; H04N 5/202; H04N 5/144
USPC .......................................................... 345/692
See application file for complete search history.

(56) References Cited

U.S. PATENT DOCUMENTS

| | | | |
|---|---|---|---|
| 2003/0122761 A1* | 7/2003 | Hong | G09G 3/2011 345/89 |
| 2007/0057895 A1* | 3/2007 | Kong | G09G 3/3648 345/98 |
| 2007/0132683 A1* | 6/2007 | Kong | G09G 3/2092 345/87 |
| 2010/0091042 A1 | 4/2010 | Inoue | |
| 2010/0164996 A1 | 7/2010 | Tomizawa et al. | |

\* cited by examiner

| ROW | COLUMN | | | | | | | | | | | |
|---|---|---|---|---|---|---|---|---|---|---|---|---|
| | | 1 | | | 2 | | | 3 | | | 4 | |
| | | 1R | 1G | 1B | 2R | 2G | 2B | 3R | 3G | 3B | 4R | 4G | 4B |
| 1 | A | B | A | B | A | B | A | B | A | B | A | B |
| 2 | B | A | B | A | B | A | B | A | B | A | B | A |
| 3 | A | B | A | B | A | B | A | B | A | B | A | B |
| 4 | B | A | B | A | B | A | B | A | B | A | B | A |

MSGP1

FIG. 4

| ROW | COLUMN | | | | | | | | | | | | |
|---|---|---|---|---|---|---|---|---|---|---|---|---|---|
| | | 1 | | | 2 | | | 3 | | | 4 | | |
| | | 1R | 1G | 1B | 2R | 2G | 2B | 3R | 3G | 3B | 4R | 4G | 4B |
| 1 | | A | B | A | B | A | B | A | B | A | B | A | B |
| 2 | | A | B | A | B | A | B | A | B | A | B | A | B |
| 3 | | A | B | A | B | A | B | A | B | A | B | A | B |
| 4 | | A | B | A | B | A | B | A | B | A | B | A | B |

MSGP2

FIG. 5

MTGP1

|   | FN+1 | FN+2 | FN+3 | FN+4 |
|---|------|------|------|------|
| A | H    | L    | L    | L    |
| B | L    | L    | H    | L    |

FIG. 6

MTGP2

|   | FN+1 | FN+2 | FN+3 | FN+4 |
|---|------|------|------|------|
| A | H    | L    | L    | H    |
| B | L    | H    | H    | L    |

| INPUT DATA | DATA1 | |
|---|---|---|
| | HIGH GAMMA DATA(H) | LOW GAMMA DATA(L) |
| 0G | 0G | 0G |
| 32G | 64G | 0G |
| 63G | 109G | 0G |
| 95G | 157G | 0G |
| 127G | 213G | 44G |
| 159G | 239G | 77G |
| 191G | 251G | 149G |
| 223G | 253G | 209G |
| 255G | 255G | 255G |

GAMMA APPLIED DATA GENERATING CIRCUIT AND DISPLAY DEVICE INCLUDING THE SAME

PRIORITY STATEMENT

This U.S. Non-provisional application claims priority under 35 USC §119 to Korean Patent Application No. 10-2014-0115307, filed on Sep. 1, 2014, in the Korean Intellectual Property Office (KIPO), the disclosure of which is incorporated by reference in its entirety herein.

BACKGROUND

Field

Exemplary embodiments relate to a display device. More particularly, exemplary embodiments relate to a display device having a wide view angle and minimizing image distortion.

Description of the Related Art

A liquid crystal display (LCD) panel may include a thin film transistor (TFT) substrate, an opposing substrate and a liquid crystal (LC) layer disposed between the two substrates. The TFT substrate may include a plurality of gate lines, a plurality of data lines crossing the gate lines, a plurality of TFTs connected to the gate lines and the data lines, and a plurality of pixel electrodes connected to the TFTs. A TFT may include a gate electrode extended from a gate line, a source electrode extended to a data line, and a drain electrode spaced apart from the source electrode.

The LCD panel may not emit light by itself. In other words, it is not self-emissive. The LCD panel may receive light from the backside of the LCD panel or from the front of the LCD panel. The LCD panel may have limited view angle.

Converting gamma pattern, which is applied to an input data, temporally or spatially may increase the view angle. In this case, flickers occur in the frame image during changing between gamma patterns.

SUMMARY

Exemplary embodiments provide a gamma applied data generating circuit having a wide view angle and minimizing image distortion.

Exemplary embodiments also provide a display device including a gamma applied data generating circuit having a wide view angle and minimizing image distortion.

According to an example embodiment, a gamma applied data generating circuit includes a motion vector extractor, a gamma pattern generator, a first gamma applier, a second gamma applier, and an output converter. The motion vector extractor extracts a motion vector of an object included in a frame image based on an input data. The gamma pattern generator generates a first gamma pattern corresponding to a first motion vector value and a second gamma pattern corresponding to a second motion vector value from a first time point. A value of the motion vector is changed from the first motion vector value to the second motion vector value at the first time point. The first gamma applier generates a first data by applying the first gamma pattern to the input data. The second gamma applier generates a second data by applying the second gamma pattern to the input data. The output converter outputs a sum of a first weighted data and a second weighted data as a gamma applied data. The first weighted data is a product of the first data and a first weight. The second weighted data is a product of the second data and a second weight. From the first time point to a second time point, the output converter converts the first weight from 1 to 0 and the output converter converts the second weight from 0 to 1. The second time point is after a gamma pattern converting time from the first time point.

In an example embodiment, the gamma pattern generator may include a pattern look-up table having a plurality of minimum distortion gamma patterns corresponding to a plurality of motion vector values.

In an example embodiment, in a case that a certain motion vector value of the plurality of the motion vector values corresponds to a certain minimum distortion gamma pattern of the plurality of the minimum distortion gamma patterns, the certain minimum distortion gamma pattern may minimize image distortion on the object when the motion vector of the object has the certain motion vector value.

In an example embodiment, each of the plurality of the minimum distortion gamma patterns may include a minimum distortion spatial gamma pattern and a minimum distortion temporal gamma pattern.

In an example embodiment, the gamma pattern generator may output a first minimum distortion gamma pattern corresponding to the first motion vector value as the first gamma pattern based on the pattern look-up table.

In an example embodiment, the gamma pattern generator may output a second minimum distortion gamma pattern corresponding to the second motion vector value as the second gamma pattern based on the pattern look-up table.

In an example embodiment, each of the first and the second gamma appliers may include a first gamma look-up table and a second gamma look-up table, and the first and second gamma look-up tables may include a high-luminance gamma converting characteristic and a low-luminance gamma converting characteristic, respectively.

In an example embodiment, the first gamma applier may further include a first gamma pattern register storing the first gamma pattern and the second gamma applier may further include a second gamma pattern register storing the second gamma pattern.

In an example embodiment, the first gamma pattern may include a first spatial gamma pattern and a first temporal gamma pattern and the second gamma pattern may include a second spatial gamma pattern and a second temporal gamma pattern.

In an example embodiment, the first temporal gamma pattern may be equal to the second temporal gamma pattern.

In an example embodiment, the first spatial gamma pattern may determine whether a first gamma converting characteristic is applied to the input data corresponding to each of N×M sub-pixels (N, M are natural numbers) or a second gamma converting characteristic is applied to the input data corresponding to each of the N×M sub-pixels, and the first temporal gamma pattern may determine whether the high-luminance gamma converting characteristic is used as the first gamma converting characteristic, the low-luminance gamma converting characteristic is used as the second gamma converting characteristic or the high-luminance gamma converting characteristic is used as the second gamma converting characteristic, the low-luminance gamma converting characteristic is used as the first gamma converting characteristic, in each of a plurality of continuing frames.

In an example embodiment, the second spatial gamma pattern may be different from the first spatial gamma pattern, the second spatial gamma pattern may determine whether a third gamma converting characteristic is applied to the input data corresponding to each of the N×M sub-pixels or a fourth gamma converting characteristic is applied to the input data corresponding to each of the N×M sub-pixels, and the second temporal gamma pattern may determine whether the high-luminance gamma converting characteristic is used as the third gamma converting characteristic, the low-luminance gamma converting characteristic is used as the fourth gamma converting characteristic or the high-luminance gamma converting characteristic is used as the fourth gamma converting characteristic, the low-luminance gamma converting characteristic is used as the third gamma converting characteristic, in each of the plurality of the continuing frames.

In an example embodiment, the output converter may output the second data as the gamma applied data after the second time point.

In an example embodiment, a sum of the first weight and the second weight may be 1.

According to an example embodiment, a display device includes a display panel, a gamma applied data generating circuit, a timing controller, a gate driving circuit, and a data driving circuit. The display panel includes a plurality of sub-pixels. The gamma applied data generating circuit generates a gamma applied data based on an input data. The timing controller generates a data driving circuit control signal and a gate driving circuit control signal. The gate driving circuit generates a plurality of gate signals based on the gate driving circuit control signal, and provide the plurality of gate signals to the plurality of the sub-pixels through a plurality of gate signal lines. The data driving circuit generates a plurality of data signals based on the data driving circuit control signal and the gamma applied data, and provide the plurality of the data signals to the plurality of the sub-pixels through a plurality of data signal lines. The gamma applied data generating circuit includes a motion vector extractor, a gamma pattern generator, a first gamma applier, a second gamma applier, and an output converter. The motion vector extractor extracts a motion vector of an object included in a frame image based on the input data. The gamma pattern generator generates a first gamma pattern corresponding to a first motion vector value and a second gamma pattern corresponding to a second motion vector value from a first time point. A value of the motion vector is changed from the first motion vector value to the second motion vector value at the first time point. The first gamma applier generates a first data by applying the first gamma pattern to the input data. The second gamma applier generates a second data by applying the second gamma pattern to the input data. The output converter outputs a sum of a first weighted data and a second weighted data as the gamma applied data. The first weighted data is a product of the first data and a first weight. The second weighted data is a product of the second data and a second weight. From the first time point to a second time point, the output converter converts the first weight from 1 to 0 and the output converter converts the second weight from 0 to 1. The second time point is after a gamma pattern converting time from the first time point.

As described above, a display device according to example embodiments may minimize image distortion by reducing flickers, which are generated in motion vector changing time.

BRIEF DESCRIPTION OF THE DRAWINGS

The above and other features and advantages will become more apparent by describing exemplary embodiments thereof with reference to the accompanying drawings, in which.

DETAILED DESCRIPTION

Exemplary embodiments will be described more fully hereinafter with reference to the accompanying drawings, in which various embodiments are shown.

Figure 1:
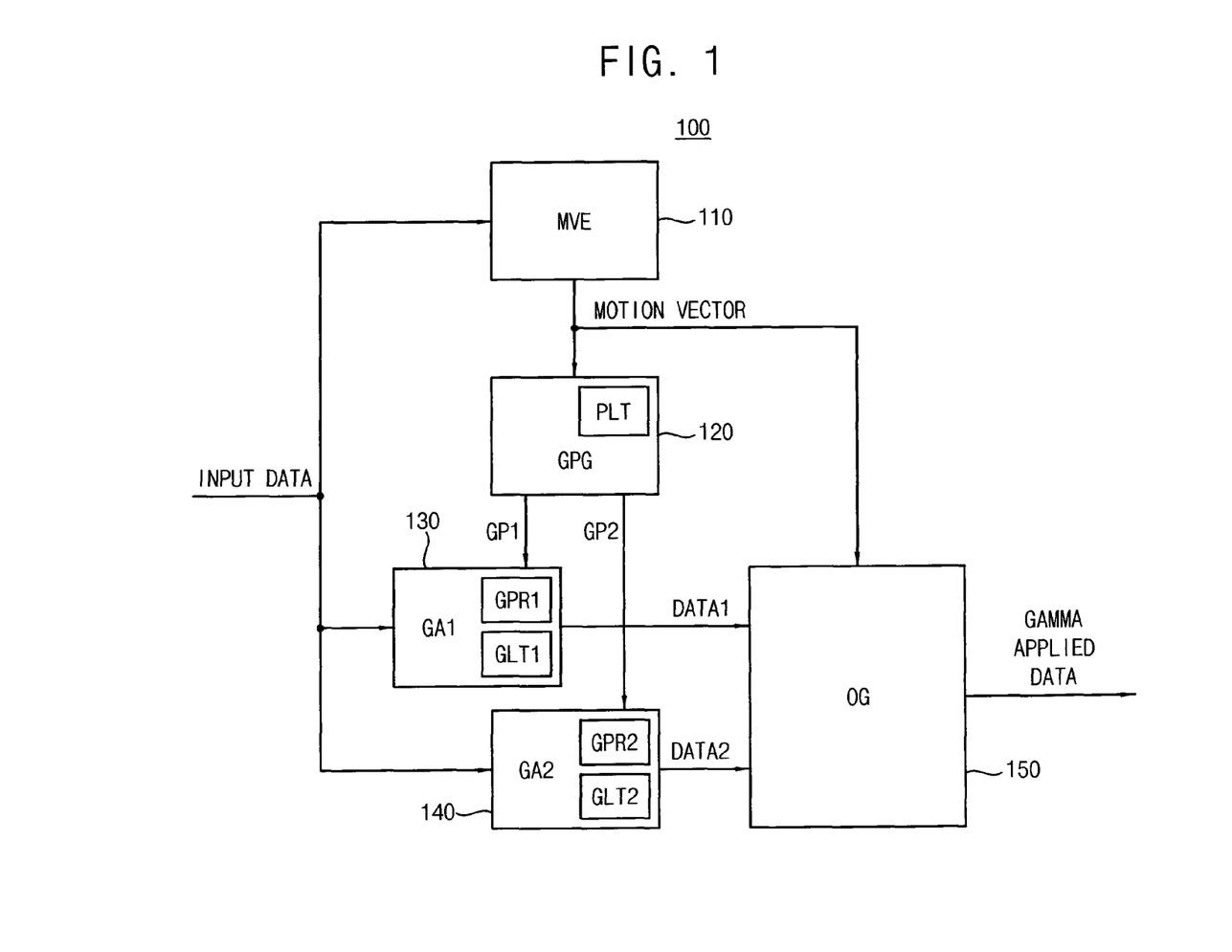
FIG. 1 is a block diagram illustrating a gamma applied data generating circuit according to an example embodiment.

FIG. 1 is a block diagram illustrating a gamma applied data generating circuit according to an example embodiment.

Referring to FIG. 1, a gamma applied data generating circuit 100 includes a motion vector extractor MVE 110, a gamma pattern generator GPG 120, a first gamma applier GA1 130, a second gamma applier GA2 140, and an output converter OG 150. The motion vector extractor 110 extracts a motion vector MOTION VECTOR included in an input data INPUT DATA representing a frame image of an object. The motion vector MOTION VECTOR includes X-axis moving velocity of the object and Y-axis moving velocity of the object. The gamma pattern generator 120 generates a first gamma pattern GP1 corresponding to a first motion vector value and a second gamma pattern GP2 corresponding to a second motion vector value from a first time point. A value of the motion vector MOTION VECTOR is changed from the first motion vector value to the second motion vector value at the first time point. The first gamma applier 130 generates a first data DATA1 by applying the first gamma pattern GP1 to the input data INPUT DATA. The second gamma applier 140 generates a second data DATA2 by applying the second gamma pattern GP2 to the input data INPUT DATA. The output converter 150 outputs a sum of a first weighted data and a second weighted data as a gamma applied data GAMMA APPLIED DATA. The first weighted data is a product of the first data DATA1 and a first weight. The second weighted data is a product (multiplication) of the second data DATA2 and a second weight. From the first time point to a second time point, the output converter 150 converts the first weight from 1 to 0 and the output converter converts the second weight from 0 to 1. The second time point is after a gamma pattern converting time from the first time point. The procedure that the output converter 150 converts the gamma applied data GAMMA APPLIED DATA from the first data DATA1 to the second data DATA2 by changing the first and second weights will be described with the reference to FIG. 9.

The gamma pattern generator 120 may include a pattern look-up table PLT having a plurality of minimum distortion gamma patterns corresponding to a plurality of motion vector values. The pattern look-up table PLT will be described with the references to FIGS. 2 through 6.

The gamma pattern generator 120 may output a first minimum distortion gamma pattern corresponding to the first motion vector value as the first gamma pattern GP1 based on the pattern look-up table PLT. The gamma pattern generator 120 may output a second minimum distortion gamma pattern corresponding to the second motion vector value as the second gamma pattern GP2 based on the pattern look-up table PLT.

Each of the first and the second gamma appliers 130, 140 may include a first gamma look-up table GLT1 and a second gamma look-up table GLT2, and the first and second gamma look-up tables GLT1 and GLT2 may include a high-luminance gamma converting characteristic and a low-luminance gamma converting characteristic, respectively. The high-luminance gamma converting characteristic and the low-luminance gamma converting characteristic stored in the first and second gamma look-up table GLT1 and GLT2 will be described with the references to FIGS. 7 and 8.

The first gamma applier 130 may further include a first gamma pattern register GPR1 storing the first gamma pattern GP1, and the second gamma applier 140 may further include a second gamma pattern register GPR2 storing the second gamma pattern GP2. The first gamma pattern GP1 may include a first spatial gamma pattern and a first temporal gamma pattern, and the second gamma pattern GP2 may include a second spatial gamma pattern and a second temporal gamma pattern.

The motion vector extractor 110 may extract the motion vector MOTION VECTOR of the object included in the frame image by comparing at least one previous frame data and a current frame data. The motion vector MOTION VECTOR may be extracted through various algorithms (e.g. motion estimation motion compensation (MEMC)).

Figure 2:
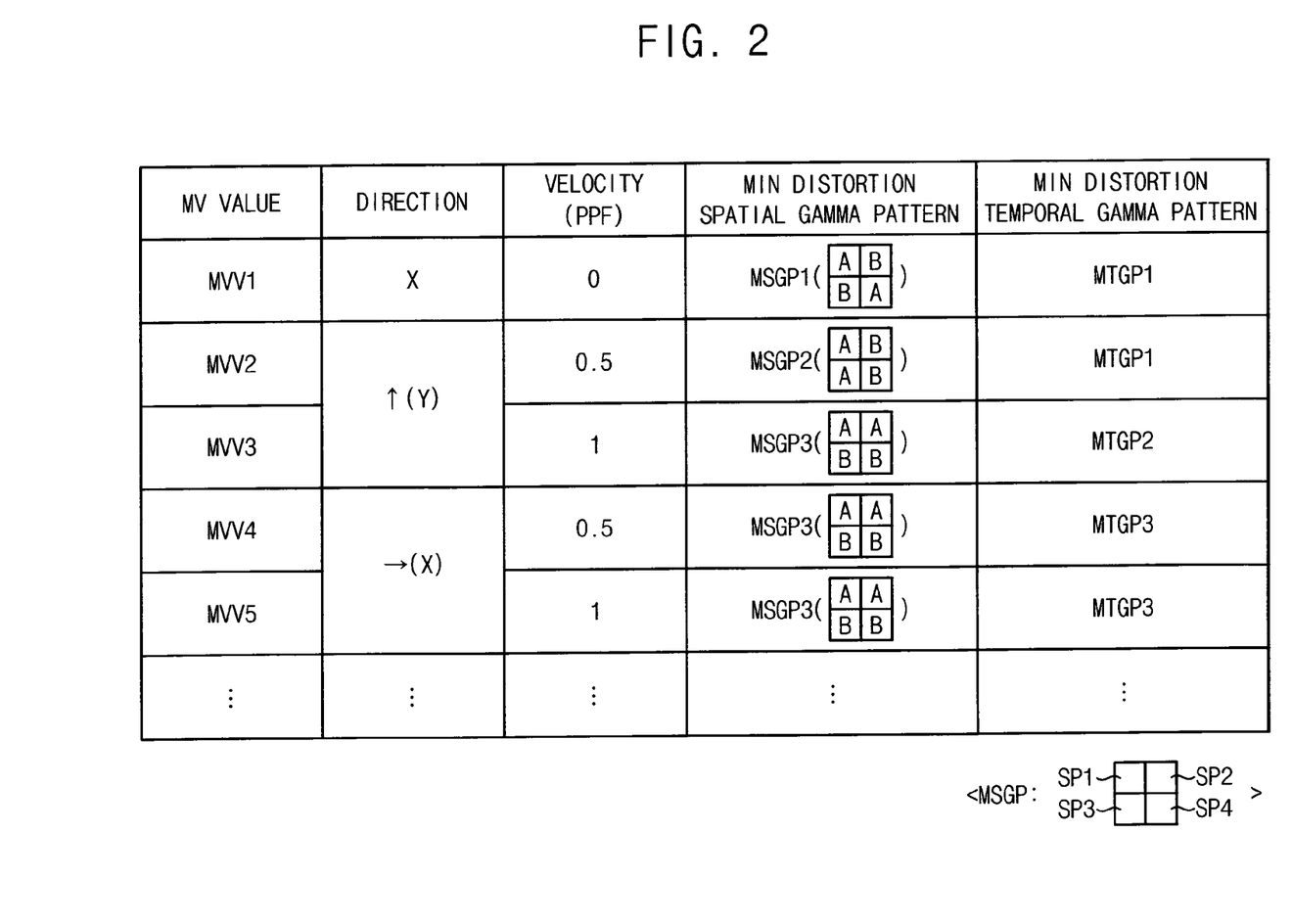
FIG. 2 is a pattern look-up table included in the gamma applied data generating circuit of FIG. 1.

FIG. 2 is a pattern look-up table included in the gamma applied data generating circuit of FIG. 1.

Referring to FIG. 2, the pattern look-up table PLT included in the gamma applied data generating circuit 100 of FIG. 1 may includes first through fifth minimum distortion gamma patterns corresponding to first through fifth motion vector values MVV1, MVV2, MVV3, MVV4, and MVV5. The pattern look-up table PLT may further include additional minimum distortion gamma patterns corresponding to additional motion vector values.

FIG. 2 illustrates the case that minimum distortion spatial gamma pattern MSGP is defined to 2×2 sub-pixels SP1, SP2, SP3, and SP4. The minimum distortion spatial gamma pattern MSGP may determine whether a first gamma converting characteristic A is applied to the input data INPUT DATA corresponding to each of the 2×2 sub-pixels SP1, SP2, SP3, and SP4 or a second gamma converting characteristic B is applied to the input data INPUT DATA corresponding to each of the 2×2 sub-pixels SP1, SP2, SP3, and SP4.

The minimum distortion spatial gamma pattern MSGP may be defined to M×N sub-pixels (M, N are natural numbers, respectively). In an example embodiment, another gamma converting characteristic other than the first and second gamma converting characteristics A and B may be applied to the input data INPUT DATA corresponding to each of the 2×2 sub-pixels SP1, SP2, SP3, and SP4 according to the minimum distortion spatial gamma pattern MSGP.

The first motion vector value MVV1 corresponds to the first minimum distortion gamma pattern. The first motion vector value MVV1 includes a first motion direction and a first motion velocity. The first motion direction is none (no direction) and the first motion velocity is 0. The first minimum distortion gamma pattern includes a first minimum distortion spatial gamma pattern MSGP1 and a first minimum distortion temporal gamma pattern MTGP1. According to the first minimum distortion spatial gamma pattern MSGP1, the first gamma converting characteristic A is applied to the input data INPUT DATA corresponding to the first sub-pixel SP1, the second gamma converting characteristic B is applied to the input data INPUT DATA corresponding to the second sub-pixel SP2, the second gamma converting characteristic B is applied to the input data INPUT DATA corresponding to the third sub-pixel SP3, and the first gamma converting characteristic A is applied to the input data INPUT DATA corresponding to the fourth sub-pixel SP4. The first minimum distortion spatial gamma pattern MSGP1 will be described with the reference to FIG. 3 and the first minimum distortion temporal gamma pattern MTGP1 will be described with the reference to FIG. 5.

The second motion vector value MVV2 corresponds to the second minimum distortion gamma pattern. The second motion vector value MVV2 includes a second motion direction and a second motion velocity. The second motion direction is +Y, and the second motion velocity is 0.5 pixels per frame (PPF). The second minimum distortion gamma pattern includes a second minimum distortion spatial gamma pattern MSGP2 and a first minimum distortion temporal gamma pattern MTGP1. According to the second minimum distortion spatial gamma pattern MSGP2, the first gamma converting characteristic A is applied to the input data INPUT DATA corresponding to the first sub-pixel SP1, the second gamma converting characteristic B is applied to the input data INPUT DATA corresponding to the second sub-pixel SP2, the first gamma converting characteristic A is applied to the input data INPUT DATA corresponding to the third sub-pixel SP3, and the second gamma converting characteristic B is applied to the input data INPUT DATA corresponding to the fourth sub-pixel SP4. The second minimum distortion spatial gamma pattern MSGP2 will be described with the reference to FIG. 4 and the first minimum distortion temporal gamma pattern MTGP1 will be described with the reference to FIG. 5.

The third motion vector value MVV3 corresponds to the third minimum distortion gamma pattern. The third motion vector value MVV3 includes a third motion direction and a third motion velocity. The third motion direction is +Y and the third motion velocity is 1 pixel per frame (PPF). The third minimum distortion gamma pattern includes a third minimum distortion spatial gamma pattern MSGP3 and a second minimum distortion temporal gamma pattern MTGP2. According to the third minimum distortion spatial gamma pattern MSGP3, the first gamma converting characteristic A is applied to the input data INPUT DATA corresponding to the first sub-pixel SP1, the first gamma converting characteristic A is applied to the input data INPUT DATA corresponding to the second sub-pixel SP2, the second gamma converting characteristic B is applied to the input data INPUT DATA corresponding to the third sub-pixel SP3, and the second gamma converting characteristic B is applied to the input data INPUT DATA corresponding to the fourth sub-pixel SP4. The second minimum distortion temporal gamma pattern MTGP2 will be described with the reference to FIG. 6.

Remaining of the pattern look-up table PLT may be understood based on the description.

The first minimum distortion gamma pattern may minimize image distortion of the object when the motion vector MOTION VECTOR of the object has the first motion vector value MVV1. The second minimum distortion gamma pattern may minimize image distortion of the object when the motion vector MOTION VECTOR of the object has the second motion vector value MVV2. The third minimum distortion gamma pattern may minimize image distortion of the object when the motion vector MOTION VECTOR of the object has the third motion vector value MVV3.

Figure 3:
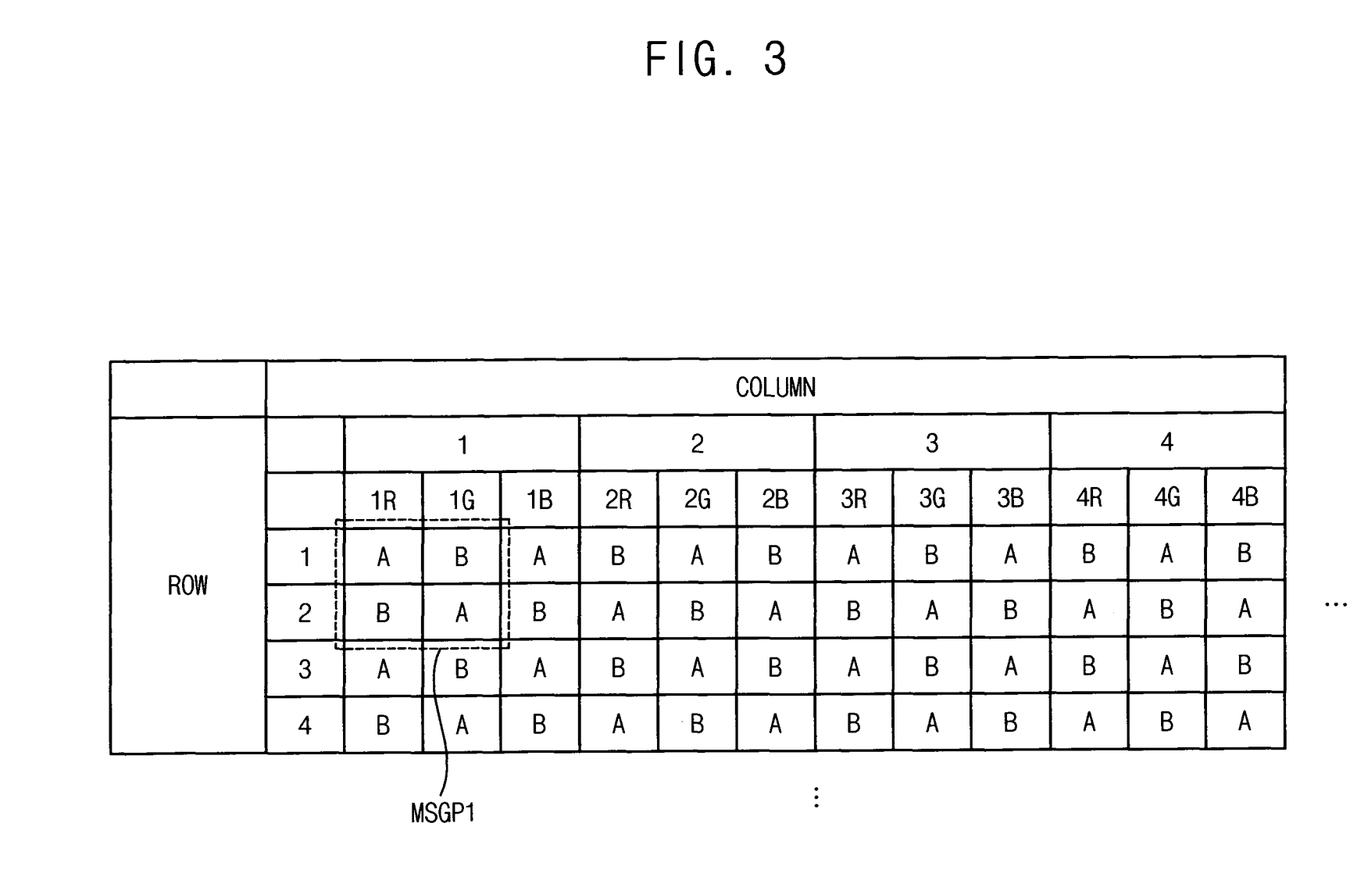
FIG. 3 is a table illustrating the sub-pixels' first spatial gamma arrangement including the first minimum distortion spatial gamma pattern of the pattern look-up table of FIG. 2.

FIG. 3 is a table illustrating the sub-pixels' first spatial gamma arrangement including the first minimum distortion spatial gamma pattern of the pattern look-up table of FIG. 2.

Referring to FIG. 3, a display device includes a plurality of sub-pixels corresponding to a plurality of rows ROW1 through ROW4 and a plurality of columns 1R through 4B. The first spatial gamma arrangement may be generated by repeating the first minimum distortion spatial gamma pattern MSGP1 periodically.

Figure 4:
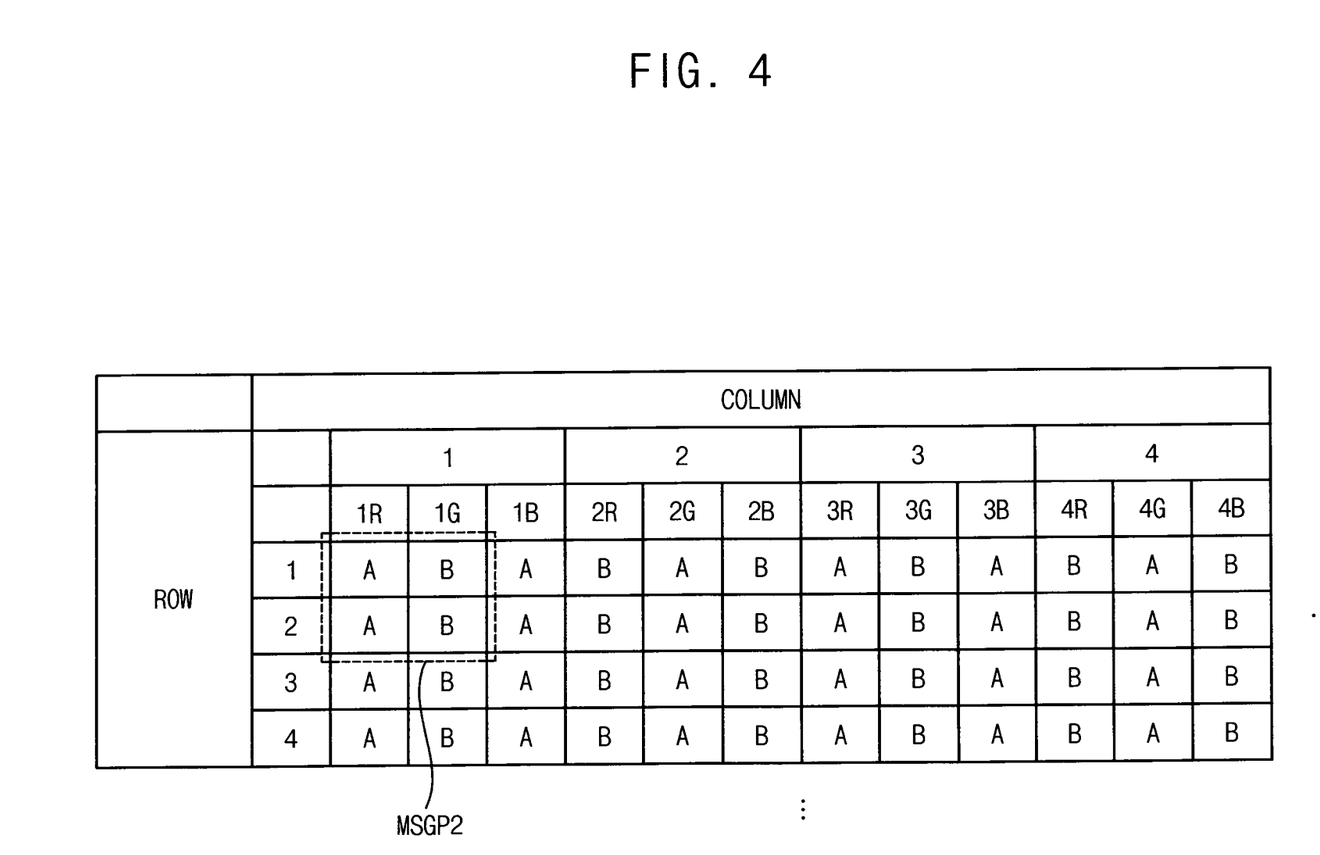
FIG. 4 is a table illustrating the sub-pixels' second spatial gamma arrangement including the second minimum distortion spatial gamma pattern of the pattern look-up table of FIG. 2.

FIG. 4 is a table illustrating the sub-pixels' second spatial gamma arrangement including the second minimum distortion spatial gamma pattern of the pattern look-up table of FIG. 2.

Referring to FIG. 4, the display device includes a plurality of sub-pixels corresponding to a plurality of rows ROW1 through ROW4 and a plurality of columns 1R through 4B. The second spatial gamma arrangement may be generated by repeating the second minimum distortion spatial gamma pattern MSGP2 periodically.

Figure 5:
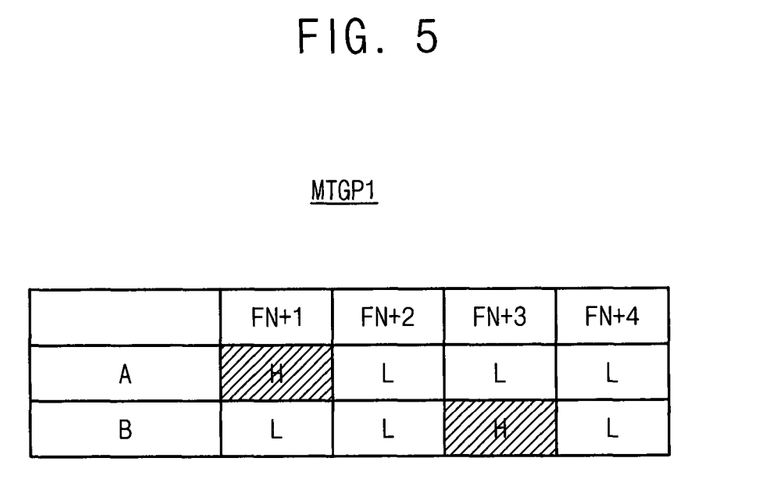
FIG. 5 is a table illustrating the first minimum distortion temporal gamma pattern of the pattern look-up table of FIG. 2.

FIG. 5 is a table illustrating the first minimum distortion temporal gamma pattern of the pattern look-up table of FIG. 2.

Referring to FIG. 5, the first minimum distortion temporal gamma pattern MTGP1 may determine whether the high-luminance gamma converting characteristic H is used as the first gamma converting characteristic A, the low-luminance gamma converting characteristic L is used as the second gamma converting characteristic B, or the high-luminance gamma converting characteristic H is used as the second gamma converting characteristic B, the low-luminance gamma converting characteristic L is used as the first gamma converting characteristic A, in each of a plurality of continuing four frames FN+1, FN+2, FN+3, and FN+4. In an example embodiment, the first minimum distortion temporal gamma pattern MTGP1 may be defined to continuing N frames (N is a natural number).

According to the first minimum distortion temporal gamma pattern MTGP1, the high-luminance gamma converting characteristic H is used as the first gamma converting characteristic A and the low-luminance gamma converting characteristic L is used as the second gamma converting characteristic B at the (N+1)-th frame FN+1. According to the first minimum distortion temporal gamma pattern MTGP1, the low-luminance gamma converting characteristic L is used as the first gamma converting characteristic A and the low-luminance gamma converting characteristic L is used as the second gamma converting characteristic B at the (N+2)-th frame FN+2. According to the first minimum distortion temporal gamma pattern MTGP1, the low-luminance gamma converting characteristic L is used as the first gamma converting characteristic A and the high-luminance gamma converting characteristic H is used as the second gamma converting characteristic B at the (N+3)-th frame FN+3. According to the first minimum distortion temporal gamma pattern MTGP1, the low-luminance gamma converting characteristic L is used as the first gamma converting characteristic A and the low-luminance gamma converting characteristic L is used as the second gamma converting characteristic B at the (N+4)-th frame FN+4.

Figure 6:
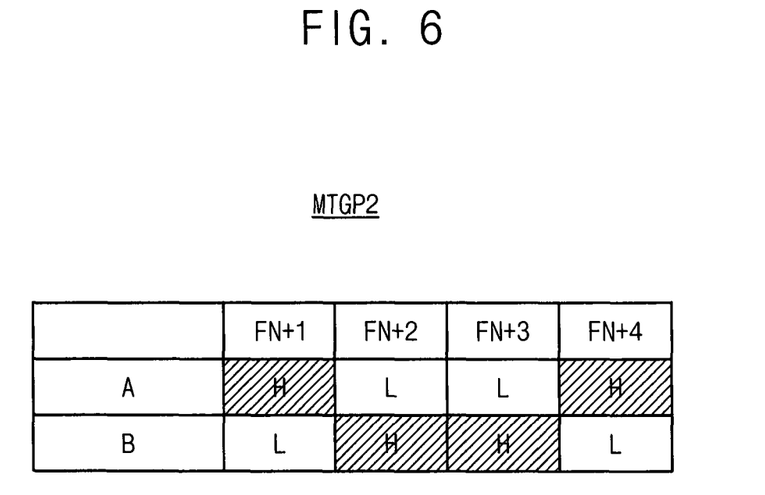
FIG. 6 is a table illustrating the second minimum distortion temporal gamma pattern of the pattern look-up table of FIG. 2.

FIG. 6 is a table illustrating the second minimum distortion temporal gamma pattern of the pattern look-up table of FIG. 2.

Referring to FIG. 6, the second minimum distortion temporal gamma pattern MTGP2 may determine whether the high-luminance gamma converting characteristic H is used as the first gamma converting characteristic A, the low-luminance gamma converting characteristic L is used as the second gamma converting characteristic B, or the high-luminance gamma converting characteristic H is used as the second gamma converting characteristic B, the low-luminance gamma converting characteristic L is used as the first gamma converting characteristic A, in each of a plurality of continuing four frames FN+1, FN+2, FN+3, and FN+4. In an example embodiment, the second minimum distortion temporal gamma pattern MTGP2 may be defined to continuing N frames (N is a natural number).

According to the second minimum distortion temporal gamma pattern MTGP2, the high-luminance gamma converting characteristic H is used as the first gamma converting characteristic A and the low-luminance gamma converting characteristic L is used as the second gamma converting characteristic B at the (N+1)-th frame FN+1. According to the second minimum distortion temporal gamma pattern MTGP2, the low-luminance gamma converting characteristic L is used as the first gamma converting characteristic A and the high-luminance gamma converting characteristic H is used as the second gamma converting characteristic B at the (N+2)-th frame FN+2. According to the second minimum distortion temporal gamma pattern MTGP2, the low-luminance gamma converting characteristic L is used as the first gamma converting characteristic A and the high-luminance gamma converting characteristic H is used as the second gamma converting characteristic B at the (N+3)-th frame FN+3. According to the second minimum distortion temporal gamma pattern MTGP2, the high-luminance gamma converting characteristic H is used as the first gamma converting characteristic A and the low-luminance gamma converting characteristic L is used as the second gamma converting characteristic B at the (N+4)-th frame FN+4.

Figure 7:
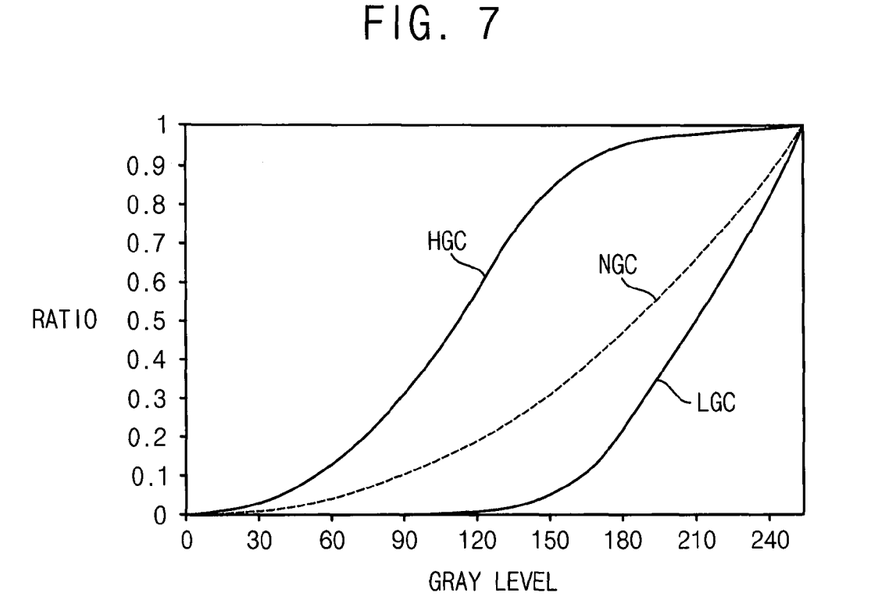
FIGS. 7 and 8 are diagrams illustrating the high-luminance gamma converting characteristic and the low-luminance gamma converting characteristic, which are stored in the first and second look-up tables included in the gamma applied data generating circuit of FIG. 1, respectively.
Figure 8:
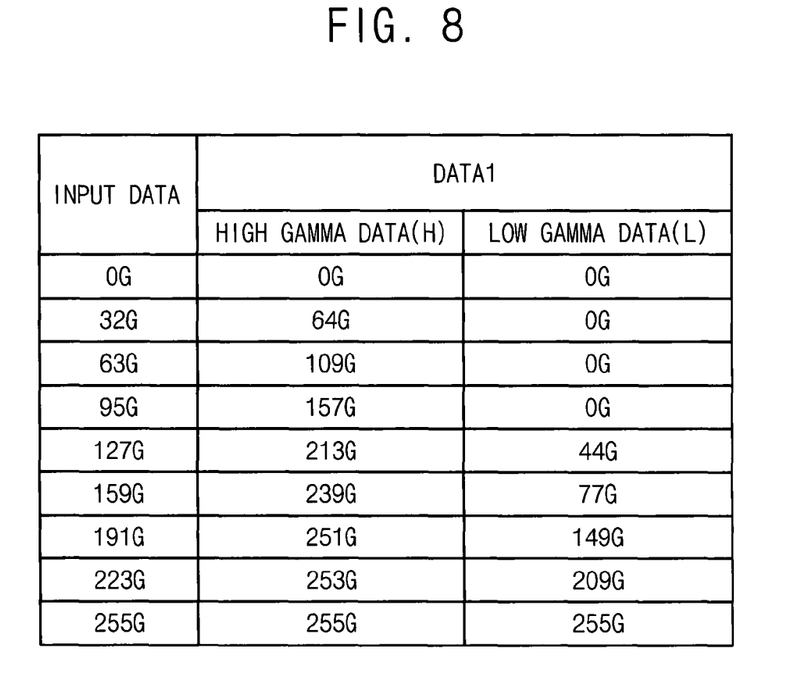

FIGS. 7 and 8 are diagrams illustrating the high-luminance gamma converting characteristic and the low-luminance gamma converting characteristic, which are stored in the first and second look-up tables included in the gamma applied data generating circuit of FIG. 1, respectively.

Referring to FIG. 7, a high-luminance gamma converting characteristic curve HGC has a high transmission ratio (a gray level of the gamma applied data GAMMA APPLIED DATA/a gray level of the input data INPUT DATA) at a medium gray level range compared to a normal gamma converting characteristic curve NGC. The high-luminance gamma converting characteristic curve HGC has similar transmission ratio with the normal gamma converting characteristic curve NGC at low or high gray level range. A low-luminance gamma converting characteristic curve LGC has a low transmission ratio at the medium gray level range compared to the normal gamma converting characteristic curve NGC. The low-luminance gamma converting characteristic curve LGC has similar transmission ratio with the normal gamma converting characteristic curve NGC at low or high gray level range.

Referring to FIG. 8, the first and second gamma applier 130 and 140 may output 213G as the first and second data DATA1 and DATA2, respectively, when the input data INPUT DATA corresponding to the first sub-pixel has 127G and the high-luminance gamma converting characteristic H is applied to the first sub-pixel. The first and second gamma applier 130 and 140 may output 44G as the first and second data DATA1 and DATA2 respectively when the input data INPUT DATA corresponding to the first sub-pixel has 127G and the low-luminance gamma converting characteristic L is applied to the first sub-pixel.

Figure 9:
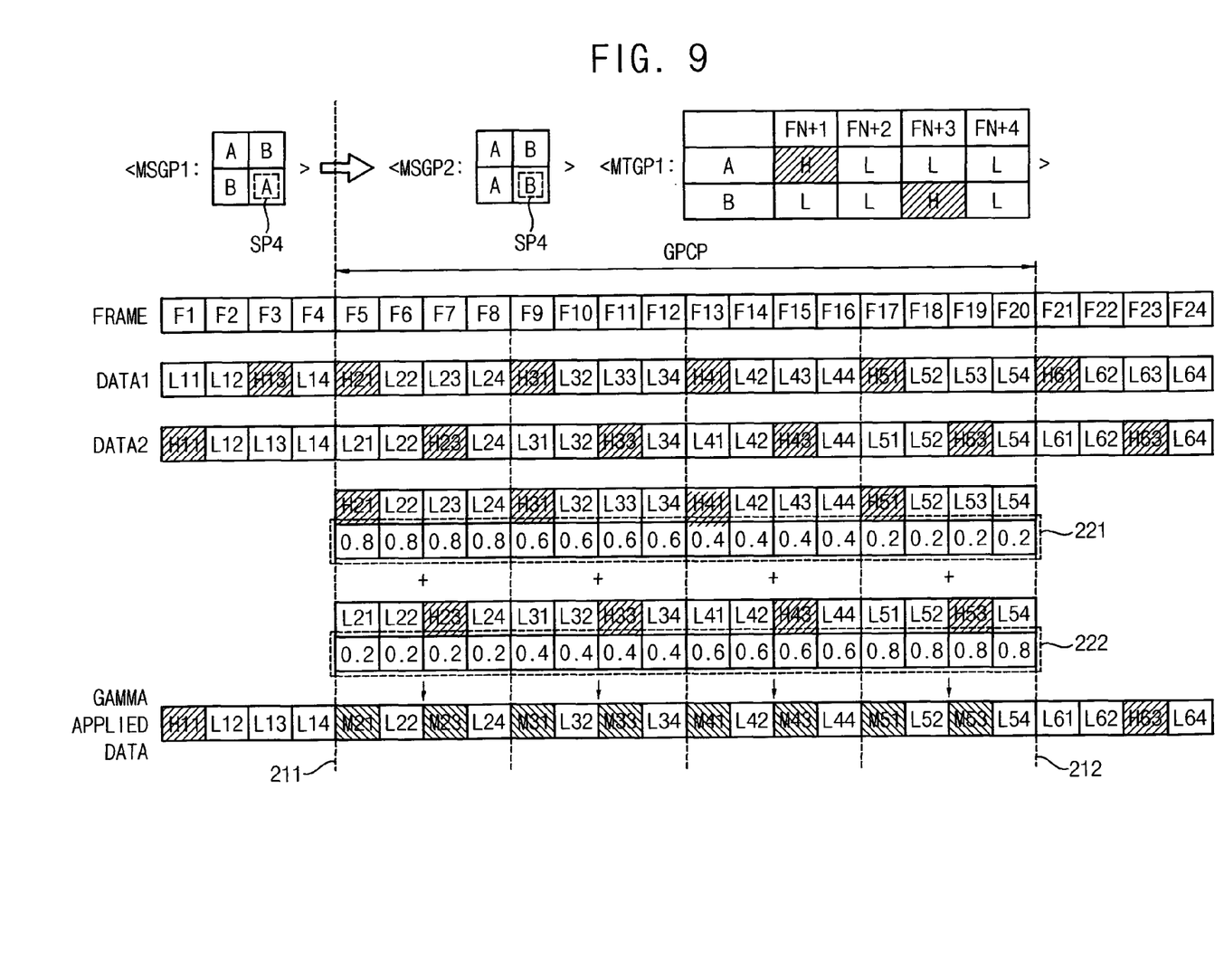
FIG. 9 is a diagram illustrating a procedure of generating the gamma applied data based on the gamma pattern conversion according to an example embodiment.

FIG. 9 is a diagram illustrating a procedure of generating the gamma applied data based on the gamma pattern conversion according to an example embodiment.

Referring to FIG. 9, at a first time point 211, value of the motion vector MOTION VECTOR is changed from the first motion vector value to the second motion vector value. The first gamma pattern GP1 corresponding to the first motion vector value includes the first minimum distortion spatial gamma pattern MSGP1 as the first spatial gamma pattern, and the first minimum distortion temporal gamma pattern MTGP1 as the first temporal gamma pattern. The second gamma pattern GP2 corresponding to the second motion vector value includes the second minimum distortion spatial gamma pattern MSGP2 as the second spatial gamma pattern, and the first minimum distortion temporal gamma pattern MTGP1 as the second temporal gamma pattern.

In FIG. 9, the first data DATA1, the second data DATA2, and the gamma applied data GAMMA APPLIED DATA correspond to the fourth sub-pixel SP4 of the minimum distortion spatial gamma patterns MSGP1, MSGP2.

In a fifth frame F5, because the first minimum distortion spatial gamma pattern MSGP1 corresponding to the fourth sub-pixel SP4 has the first gamma converting characteristic A and the first minimum distortion temporal gamma pattern MTGP1 has the high-luminance gamma converting characteristic H as the first gamma converting characteristic A at the (N+1)-th frame FN+1, the first gamma applier 130 outputs the first high-luminance data H21 as the first data DATA1 at the fifth frame F5. In a fifth frame F5, because the second minimum distortion spatial gamma pattern MSGP2 corresponding to the fourth sub-pixel SP4 has the second gamma converting characteristic B and the first minimum distortion temporal gamma pattern MTGP1 has the low-luminance gamma converting characteristic L as the second gamma converting characteristic B at the (N+1)-th frame FN+1, the second gamma applier 140 outputs the first low-luminance data L21 as the second data DATA2 at the fifth frame F5.

In a sixth frame F6, because the first minimum distortion spatial gamma pattern MSGP1 corresponding to the fourth sub-pixel SP4 has the first gamma converting characteristic A and the first minimum distortion temporal gamma pattern MTGP1 has the low-luminance gamma converting characteristic L as the first gamma converting characteristic A at the (N+2)-th frame FN+2, the first gamma applier 130 outputs the second low-luminance data L22 as the first data DATA1 at the sixth frame F6. In a sixth frame F6, because the second minimum distortion spatial gamma pattern MSGP2 corresponding to the fourth sub-pixel SP4 has the second gamma converting characteristic B and the first minimum distortion temporal gamma pattern MTGP1 has the low-luminance gamma converting characteristic L as the second gamma converting characteristic B at the (N+2)-th frame FN+2, the second gamma applier 140 outputs the second low-luminance data L22 as the second data DATA2 at the sixth frame F6.

In a seventh frame F7, because the first minimum distortion spatial gamma pattern MSGP1 corresponding to the fourth sub-pixel SP4 has the first gamma converting characteristic A and the first minimum distortion temporal gamma pattern MTGP1 has the low-luminance gamma converting characteristic L as the first gamma converting characteristic A at the (N+3)-th frame FN+3, the first gamma applier 130 outputs the third low-luminance data L23 as the first data DATA1 at the seventh frame F7. In a seventh frame F7, because the second minimum distortion spatial gamma pattern MSGP2 corresponding to the fourth sub-pixel SP4 has the second gamma converting characteristic B and the first minimum distortion temporal gamma pattern MTGP1 has the high-luminance gamma converting characteristic H as the second gamma converting characteristic B at the (N+3)-th frame FN+3, the second gamma applier 140 outputs the third high-luminance data H23 as the second data DATA2 at the seventh frame F7.

In a eighth frame F8, because the first minimum distortion spatial gamma pattern MSGP1 corresponding to the fourth sub-pixel SP4 has the first gamma converting characteristic A and the first minimum distortion temporal gamma pattern MTGP1 has the low-luminance gamma converting characteristic L as the first gamma converting characteristic A at the (N+4)-th frame FN+4, the first gamma applier 130 outputs the fourth low-luminance data L24 as the first data DATA1 at the eighth frame F8. In a eighth frame F8, because the second minimum distortion spatial gamma pattern MSGP2 corresponding to the fourth sub-pixel SP4 has the second gamma converting characteristic B and the first minimum distortion temporal gamma pattern MTGP1 has the low-luminance gamma converting characteristic L as the second gamma converting characteristic B at the (N+4)-th frame FN+4, the second gamma applier 140 outputs the fourth high-luminance data L24 as the second data DATA2 at the eighth frame F8.

Remaining of the first and second data DATA1, DATA2 may be understood based on the description.

From a first time point 211 to a second time point 212, the output converter 150 may convert the first weight 221 from 1 to 0 and the output converter 150 may convert the second weight 222 from 0 to 1. The second time point 212 is after a gamma pattern converting time GPCP from the first time point 211. A sum of the first weight 221 and the second weight 222 is 1.

In an example embodiment, the output converter 150 may set the first weight 221 as 0.8 and set the second weight 222 as 0.2 in the fifth through eighth frames (F5 through F8). The output converter 150 may set the first weight 221 as 0.6 and set the second weight 222 as 0.4 in the ninth through twelfth frames (F9 through F12). The output converter 150 may set the first weight 221 as 0.4 and set the second weight 222 as 0.6 in the thirteenth through sixteenth frames (F13 through F16). The output converter 150 may set the first weight 221 as 0.2 and set the second weight 222 as 0.8 in the seventeenth through twentieth frames (F16 through F20).

The output converter 150 may output a sum M21 of 0.8 times the first high-luminance data H21 and 0.2 times the first low-luminance data L21 (0.8×H21+0.2×L21) as the gamma applied data GAMMA APPLIED DATA at the fifth frame F5. The output converter 150 may output a sum L22 of 0.8 times the second low-luminance data L22 and 0.2 times the second low-luminance data L22 as the gamma applied data GAMMA APPLIED DATA at the sixth frame F6. The output converter 150 may output a sum M23 of 0.8 times the third low-luminance data L23 and 0.2 times the third high-luminance data H23 as the gamma applied data GAMMA APPLIED DATA at the seventh frame F7. The output converter 150 may output a sum L24 of 0.8 times the fourth low-luminance data L24 and 0.2 times the fourth low-luminance data L24 as the gamma applied data GAMMA APPLIED DATA at the eighth frame F8. The output converter 150 may output the second data DATA2 as the gamma applied data GAMMA APPLIED DATA after the second time point 212. Operation of the output converter 150 in remaining frames may be understood based on the description.

As described above, the gamma applied data generating circuit 100 according to an example embodiment may reduce flickers by pretending concentration of high-luminance data or low-luminance data from the first time point 211 to the second time point 212.

Figure 10:
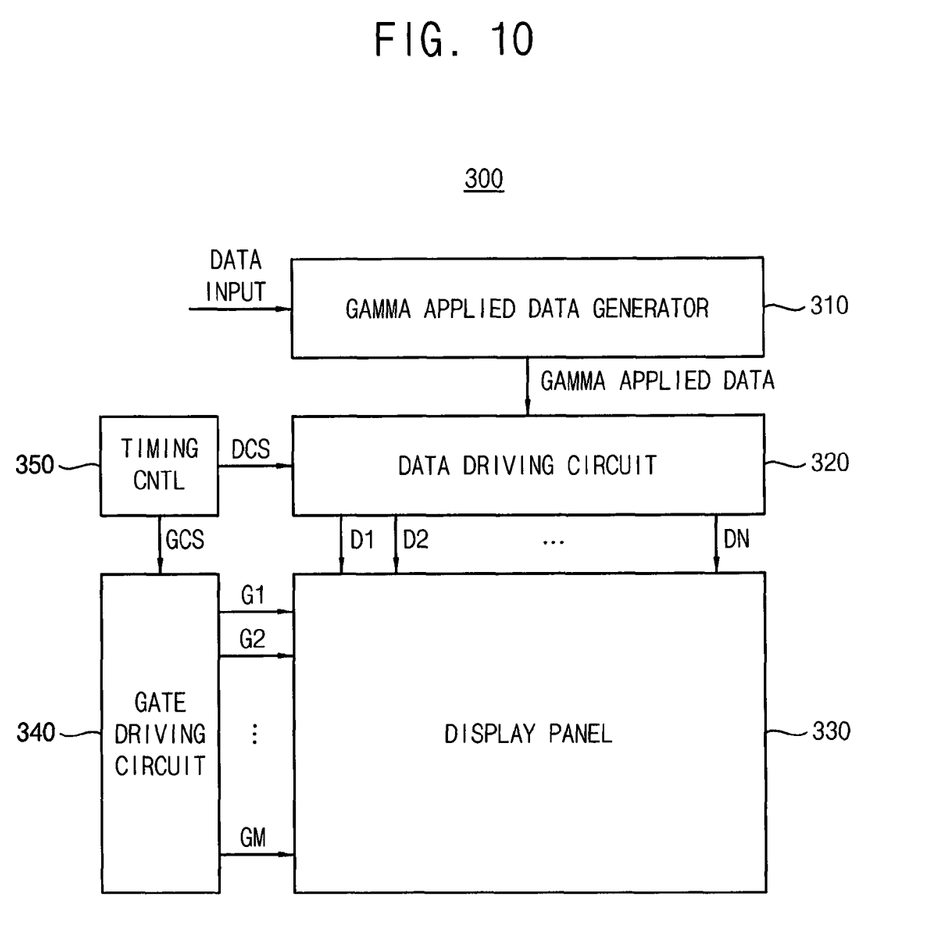
FIG. 10 is a block diagram illustrating a display device including the gamma applied data generating circuit according to an example embodiment.

FIG. 10 is a block diagram illustrating a display device including the gamma applied data generating circuit according to an example embodiment.

Referring to FIG. 10, a display device 300 includes a display panel 330, a gamma applied data generating circuit 310, a timing controller 350, a gate driving circuit 340, and a data driving circuit 320. The display panel 330 includes a plurality of sub-pixels. The gamma applied data generating circuit 310 generates a gamma applied data GAMMA APPLIED DATA based on an input data INPUT DATA. The timing controller 350 generates a data driving circuit control signal DCS and a gate driving circuit control signal GCS. The gate driving circuit 340 generates a plurality of gate signals based on the gate driving circuit control signal GCS, and provide the plurality of gate signals to the plurality of the sub-pixels through a plurality of gate signal lines G1, G2 through GM. The data driving circuit 320 generates a plurality of data signals based on the data driving circuit control signal DCS and the gamma applied data GAMMA APPLIED DATA, and provide the plurality of the data signals to the plurality of the sub-pixels through a plurality of data signal lines D1, D2 through DN.

The gamma applied data generating circuit 310 may be the gamma applied data generating circuit 100 of FIG. 1. The gamma applied data generating circuit 310 may understood based on the references to FIGS. 1 through 9.

The foregoing is illustrative and is not to be construed as limiting thereof. Although a few exemplary embodiments have been described, those skilled in the art will readily appreciate that many modifications are possible in the exemplary embodiments without materially departing from the novel teachings, aspects, and advantages of the invention. Accordingly, all such modifications are intended to be included within the scope of this disclosure.

What is claimed is:

1. A gamma applied data generating circuit, comprising:
a motion vector extractor to extract a motion vector of an object included in a frame image based on an input data;
a gamma pattern generator to generate a first gamma pattern corresponding to a first motion vector value and a second gamma pattern corresponding to a second motion vector value from a first time point, a value of the motion vector being changed from the first motion vector value to the second motion vector value at the first time point;
a first gamma applier to generate a first data by applying the first gamma pattern to the input data;
a second gamma applier to generate a second data by applying the second gamma pattern to the input data; and
an output converter to output a sum of a first weighted data and a second weighted data as a gamma applied data, the first weighted data being a product of the first data and a first weight, the second weighted data being a product of the second data and a second weight, wherein, from the first time point to a second time point, the output converter decreases the first weight, and the output converter increases the second weight, wherein the second time point is after a gamma pattern converting time from the first time point.

2. The gamma applied data generating circuit of claim 1, wherein the gamma pattern generator includes a pattern look-up table having a plurality of minimum distortion gamma patterns corresponding to a plurality of motion vector values.

3. The gamma applied data generating circuit of claim 2, wherein, in a case that a certain motion vector value of the plurality of the motion vector values corresponds to a certain minimum distortion gamma pattern of the plurality of the minimum distortion gamma patterns, the certain minimum distortion gamma pattern minimizes image distortion on the object when the motion vector of the object has the certain motion vector value.

4. The gamma applied data generating circuit of claim 2, wherein each of the plurality of the minimum distortion gamma patterns includes a minimum distortion spatial gamma pattern and a minimum distortion temporal gamma pattern.

5. The gamma applied data generating circuit of claim 2, wherein the gamma pattern generator outputs a first minimum distortion gamma pattern corresponding to the first motion vector value as the first gamma pattern based on the pattern look-up table.

6. The gamma applied data generating circuit of claim 2, wherein the gamma pattern generator outputs a second minimum distortion gamma pattern corresponding to the second motion vector value as the second gamma pattern based on the pattern look-up table.

7. The gamma applied data generating circuit of claim 1, wherein each of the first and the second gamma appliers includes a first gamma look-up table and a second gamma look-up table, the first and second gamma look-up tables include a high-luminance gamma converting characteristic and a low-luminance gamma converting characteristic, respectively.

8. The gamma applied data generating circuit of claim 7, wherein the first gamma applier further includes a first gamma pattern register storing the first gamma pattern, and the second gamma applier further includes a second gamma pattern register storing the second gamma pattern.

9. The gamma applied data generating circuit of claim 8, wherein the first gamma pattern includes a first spatial gamma pattern and a first temporal gamma pattern, and the second gamma pattern includes a second spatial gamma pattern and a second temporal gamma pattern.

10. The gamma applied data generating circuit of claim 9, wherein the first temporal gamma pattern is equal to the second temporal gamma pattern.

11. The gamma applied data generating circuit of claim 9, wherein the first spatial gamma pattern determines whether a first gamma converting characteristic is applied to the input data corresponding to each of N×M sub-pixels (N, M are natural numbers) or a second gamma converting characteristic is applied to the input data corresponding to each of the N×M sub-pixels, wherein the first temporal gamma pattern determines whether the high-luminance gamma converting characteristic is used as the first gamma converting characteristic, the low-luminance gamma converting characteristic is used as the second gamma converting characteristic or the high-luminance gamma converting characteristic is used as the second gamma converting characteristic, the low-luminance gamma converting characteristic is used as the first gamma converting characteristic, in each of a plurality of continuing frames.

12. The gamma applied data generating circuit of claim 11, wherein the second spatial gamma pattern is different from the first spatial gamma pattern, wherein the second spatial gamma pattern determines whether a third gamma converting characteristic is applied to the input data corresponding to each of the N×M sub-pixels or a fourth gamma converting characteristic is applied to the input data corresponding to each of the N×M sub-pixels, wherein the second temporal gamma pattern determines whether the high-luminance gamma converting characteristic is used as the third gamma converting characteristic, the low-luminance gamma converting characteristic is used as the fourth gamma converting characteristic or the high-luminance gamma converting characteristic is used as the fourth gamma converting characteristic, the low-luminance gamma converting characteristic is used as the third gamma converting characteristic, in each of the plurality of the continuing frames.

13. The gamma applied data generating circuit of claim 1, wherein the output converter outputs the second data as the gamma applied data after the second time point.

14. The gamma applied data generating circuit of claim 1, wherein a sum of the first weight and the second weight is 1.

15. A display device, comprising:
a display panel including a plurality of sub-pixels;
a gamma applied data generating circuit to generate a gamma applied data based on an input data;
a timing controller to generate a data driving circuit control signal and a gate driving circuit control signal;
a gate driving circuit to generate a plurality of gate signals based on the gate driving circuit control signal, and provide the plurality of gate signals to the plurality of the sub-pixels through a plurality of gate signal lines; and
a data driving circuit to generate a plurality of data signals based on the data driving circuit control signal and the gamma applied data, and provide the plurality of the data signals to the plurality of the sub-pixels through a plurality of data signal lines, the gamma applied data generating circuit including:
a motion vector extractor to extract a motion vector of an object included in a frame image based on the input data;
a gamma pattern generator to generate a first gamma pattern corresponding to a first motion vector value and a second gamma pattern corresponding to a second motion vector value from a first time point, a value of the motion vector being changed from the first motion vector value to the second motion vector value at the first time point;
a first gamma applier to generate a first data by applying the first gamma pattern to the input data;
a second gamma applier to generate a second data by applying the second gamma pattern to the input data; and
an output converter to output a sum of a first weighted data and a second weighted data as the gamma applied data, the first weighted data being a product of the first data and a first weight, the second weighted data being a product of the second data and a second weight, wherein from the first time point to a second time point, the output converter decreases the first weight, and the output converter increases the second weight, wherein the second time point is after a gamma pattern converting time from the first time point.

* * * * *